(12) United States Patent
Sze (10) Patent No.: US 10,151,912 B2
(45) Date of Patent: Dec. 11, 2018

(54) GALAXY TRACKER SMART TELESCOPE

(71) Applicant: Eastcolight (Hong Kong) Limited, Kowloon, Hong Kong (CN)

(72) Inventor: Chun Hong Johnny Sze, Kowloon (CN)

(73) Assignee: Eastcolight (Hong Kong) Limited, Kowloon (HK)

(*) Notice: Subject to any disclaimer, the term of this patent is extended or adjusted under 35 U.S.C. 154(b) by 0 days.

(21) Appl. No.: 15/403,485

(22) Filed: Jan. 11, 2017

(65) Prior Publication Data

US 2017/0199370 A1 Jul. 13, 2017

Related U.S. Application Data

(60) Provisional application No. 62/277,967, filed on Jan. 13, 2016.

(51) Int. Cl.
| | |
|---|---|
| *G02B 23/16* | (2006.01) |
| *F16M 13/02* | (2006.01) |
| *G02B 25/00* | (2006.01) |
| *G03B 17/56* | (2006.01) |
| *G02B 7/00* | (2006.01) |
| *F16M 11/04* | (2006.01) |

(52) U.S. Cl.
CPC .......... *G02B 23/16* (2013.01); *F16M 11/041* (2013.01); *F16M 13/02* (2013.01); *G02B 7/003* (2013.01); *G02B 25/001* (2013.01); *G03B 17/566* (2013.01)

(58) Field of Classification Search
CPC .......... G02B 23/16; G02B 7/00; G02B 7/003; G02B 25/001; F16M 11/041; F16M 13/02; G03B 17/566
USPC ......... 359/399, 429, 896; 248/205.1, 229.15, 248/309.1, 310, 314, 315, 316.1, 316.2, 248/918, 924
See application file for complete search history.

(56) References Cited

U.S. PATENT DOCUMENTS

| | | | | | |
|---|---|---|---|---|---|
| 3,873,823 | A | * | 3/1975 | Northrup | G01C 15/002 33/286 |
| 6,304,376 | B1 | * | 10/2001 | Baun | G02B 23/00 318/266 |
| 8,348,214 | B2 | * | 1/2013 | Vogt | F16M 11/041 248/316.4 |
| 9,066,421 | B1 | * | 6/2015 | Martin | H05K 5/0217 |
| 9,191,562 | B1 | * | 11/2015 | Schorr, II | H04N 1/00246 |
| 2005/0099683 | A1 | * | 5/2005 | Mogamiya | G02B 7/04 359/399 |
| 2005/0213959 | A1 | * | 9/2005 | Chiang | G02B 23/16 396/428 |

(Continued)

*Primary Examiner* — Frank Font
(74) *Attorney, Agent, or Firm* — Akerman LLP (57) ABSTRACT

The utility patent discloses an astronomical telescope which comprises a telescope body, and a navigation support for mounting a navigation device is arranged on the telescope body. According to the utility model, as the navigation support for mounting the navigation device is arranged on the telescope body, when in use, the navigation device such as a mobile phone and the like may be mounted on the navigation support and is made coincident in orientation with the telescope body, thus the celestial bodies that the users want to observe may be conveniently positioned using the navigation device, thereby facilitating the use.

6 Claims, 6 Drawing Sheets

(56) References Cited

U.S. PATENT DOCUMENTS

| | | | | |
|---|---|---|---|---|
| 2008/0168492 A1* | 7/2008 | Baun | ............... | G02B 23/16 |
| | | | | 348/512 |
| 2012/0174375 A1* | 7/2012 | Mcleod | ............... | F16M 11/041 |
| | | | | 29/428 |
| 2014/0317987 A1* | 10/2014 | Kuehl | ............... | G03B 29/00 |
| | | | | 42/90 |
| 2014/0325818 A1* | 11/2014 | Mayfield | ............... | F16M 11/041 |
| | | | | 29/428 |
| 2015/0167707 A1* | 6/2015 | Hyers | ............... | F16B 2/10 |
| | | | | 24/488 |
| 2016/0124210 A1* | 5/2016 | Ross | ............... | G02B 23/16 |
| | | | | 359/399 |

\* cited by examiner

GALAXY TRACKER SMART TELESCOPE

CROSS-REFERENCE TO RELATED APPLICATIONS

This application claims the benefit of U.S. Provisional Application No. 62/277,967 filed Jan. 13, 2016, which is incorporated herein by reference.

TECHNICAL FIELD

The utility patent relates to an astronomical telescope.

BACKGROUND

An astronomical telescope is an important tool for celestial observation. A certain understanding of the position of a celestial body is required when the astronomical telescope is used to observe the celestial body; otherwise it is difficult to accurately find the celestial body to be observed. However, with the popularity of the astronomical telescope, many users such as ordinary astronomy enthusiasts, young people, etc. do not possess adequate corresponding knowledge about astronomy, so that it is difficult for them to accurately find the celestial body they want to observe using the astronomical telescope. Thus, the astronomical telescope is inconvenient to use.

At present, mobile devices such as mobile phones and the like are provided with positioning softwares by which celestial bodies may be positioned. These positioning softwares employ a GPS navigating system to determine orientations of the mobile phones, and then display names and distribution of the celestial bodies in corresponding orientations, thus providing the users with convenience in finding the positions of the celestial bodies and having knowledge about the astronomy. However, When observing the celestial bodies using existing astronomical telescopes, the users may need to use a telescope for initial aiming (which is actually a low-magnification telescope) to look for the celestial bodies they want to observe but are unsure of the azimuth thereof. A general azimuth is first found, and then the astronomical telescope is fine-adjusted to a field range (a correct direction), thus being inconvenience to use.

SUMMARY

In order to solve the above problems, the utility model aims to provide an astronomical telescope which facilitates the users' looking for celestial bodies and is convenient to use.

The technical solution that the utility model adopts to solve its technical problems is as follows:

An astronomical telescope comprises a telescope body on which a navigation support for mounting a navigation device is arranged.

Preferably, the navigation support comprises a clamping bracket for clamping the navigation device and a fixed bracket fixed on the telescope body, and the clamping bracket is removably secured on the fixed bracket.

Preferably, the clamping bracket comprises a base and a substrate for clamping the navigation device, the base is removably secured on the fixed bracket, and the substrate is removably secured on the base.

Preferably, the clamping bracket is slidingly arranged on the fixed bracket, and a fixing device for constraining transverse sliding of the clamping bracket relative to the fixed bracket so as to secure the clamping bracket on the fixed bracket is arranged on the clamping bracket and/or the fixed bracket.

Preferably, both sides of the clamping bracket are respectively provided with a transverse sliding block, transverse sliding grooves matched with the sliding blocks are arranged on the fixed bracket, and the sliding blocks are slidingly inserted inside the sliding grooves to slidingly arrange the clamping bracket on the fixed bracket.

Preferably, the fixing device comprises a positioning groove and a positioning block matched with the positioning groove, one of the positioning groove and the positioning block is arranged on the clamping bracket, and the other is arranged on the fixed bracket. The positioning block is inserted inside the positioning groove with its insertion direction deviating from a sliding direction of the clamping bracket relative to the fixed bracket. The positioning block may be driven by an external force to move out of engagement with the positioning groove.

Preferably, a transverse elastic plate is arranged on the fixed bracket, the positioning block is arranged on the elastic plate and swings therewith, the elastic plate is provided with a pressing part for being pressed so as to push the elastic plate to swing up and down, and the positioning groove is arranged on the clamping bracket.

Preferably, the fixed bracket comprises a first clamping arm and a second clamping arm, wherein tail portions of the first clamping arm and the first clamping arm are pivoted together, head portions of the first clamping arm and the second clamping arm are removably fixed together by a locking member, and the first clamping arm and the second clamping arm clamp the telescope body together, thereby securing the fixed bracket on the telescope body.

Preferably, the telescope body is provided with a tubular eyepiece, the navigation device is a mobile phone, and the clamping bracket is provided with a connection cylinder which is aligned with a camera of the mobile phone. The connection cylinder may be sleeved on the eyepiece, and a locking screw is screwed on a side portion of the connection cylinder. A front end of the locking screw may compress a side wall of the eyepiece tightly, thereby securing the connection cylinder on the eyepiece.

Preferably, an adjusting plate provided with a strip-shaped adjusting hole in the middle thereof is connected on the connection cylinder, and the clamping bracket is provided with a stop bolt inserted inside the adjusting hole. A locking handwheel is screwed on the stop bolt and clamps the adjusting plate together with the clamping bracket so as to secure the adjusting plate on the clamping bracket.

The utility model has the following beneficial effects that: according to the utility model, as the navigation support for mounting the navigation device is arranged on the telescope body, when in use, the navigation device such as a mobile phone and the like may be mounted on the navigation support and is made coincident in orientation with the telescope body, thus the celestial bodies that the users want to observe may be conveniently positioned using the navigation device, thereby facilitating the use.

BRIEF DESCRIPTION OF THE DRAWINGS

The present utility model will be explained in further detail below with reference to the drawings and detailed description of the embodiments.

DETAILED DESCRIPTION

Figure 1:
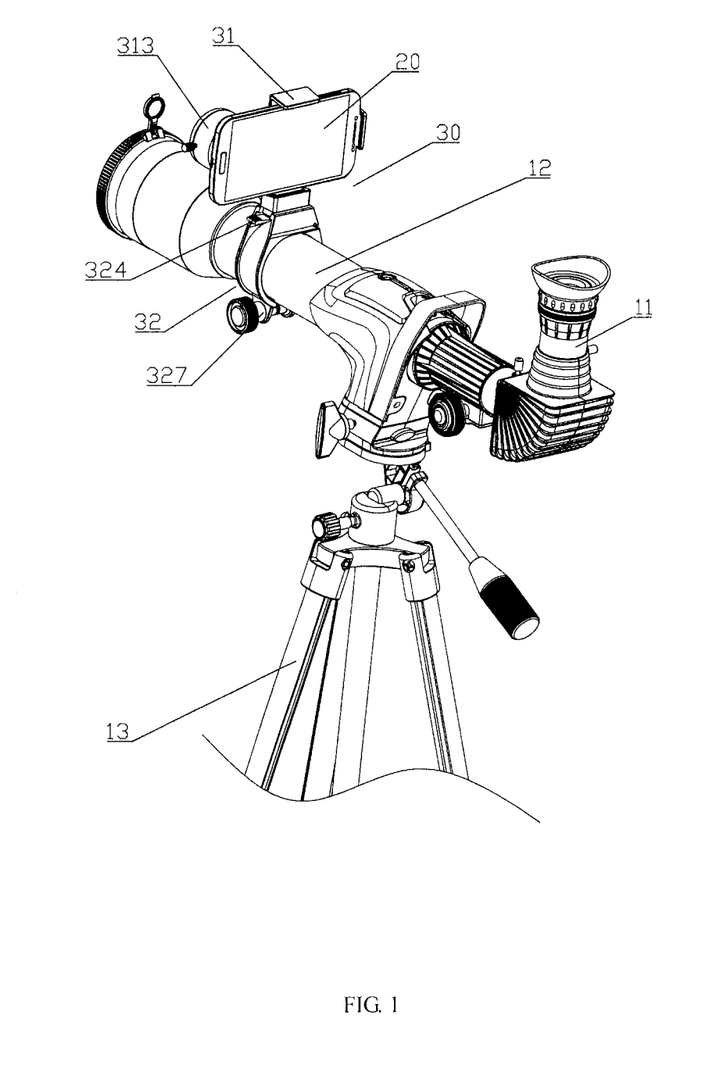
FIG. 1 is a schematic diagram of an overall structure of the astronomical telescope of the utility model.
Figure 2:
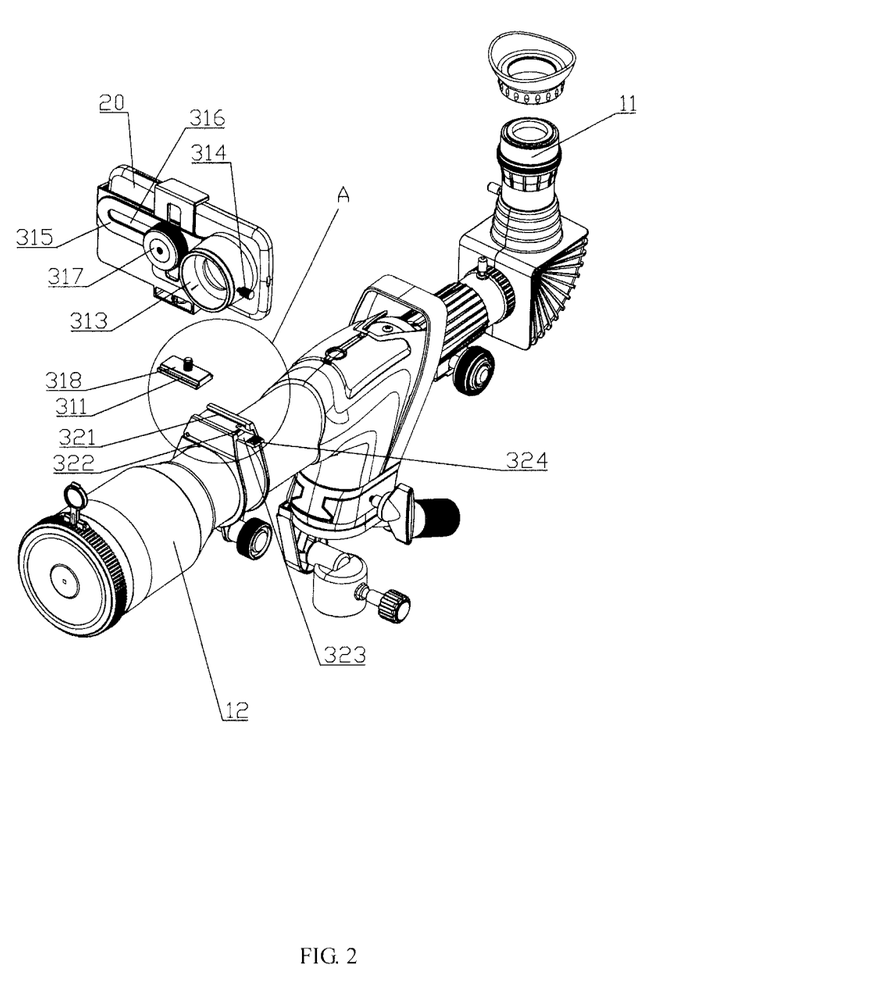
FIG. 2 is a partially exploded view of the astronomical telescope of the utility model with a tripod removed.
Figure 3:
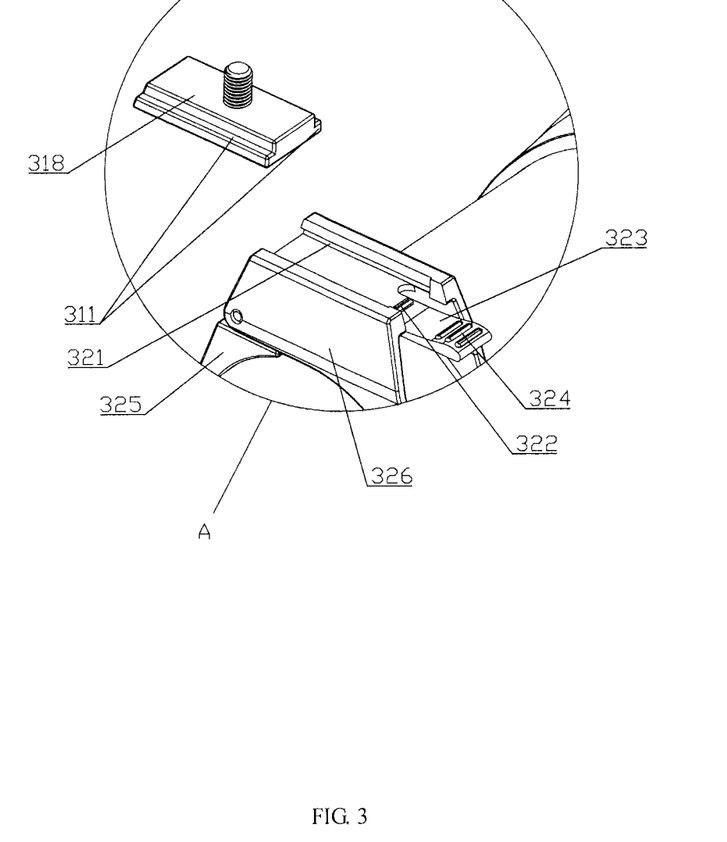
FIG. 3 is a partially enlarged view of A of FIG. 2.
Figure 4:
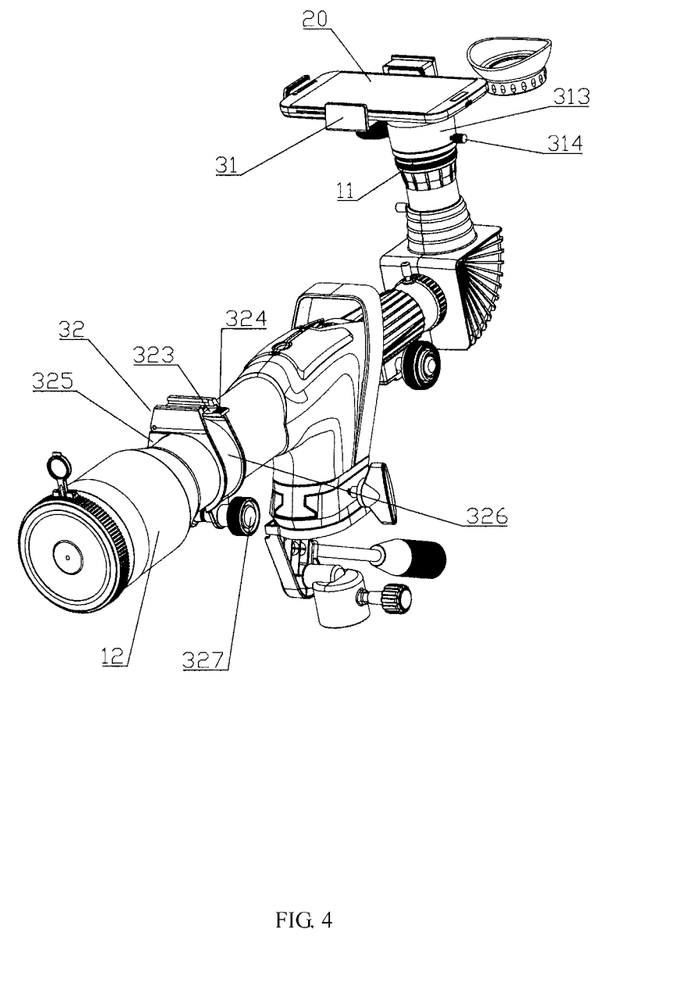
FIG. 4 is a structural schematic view of the astronomical telescope of the utility model with a clamping bracket mounted on an eyepiece.
Figure 5:
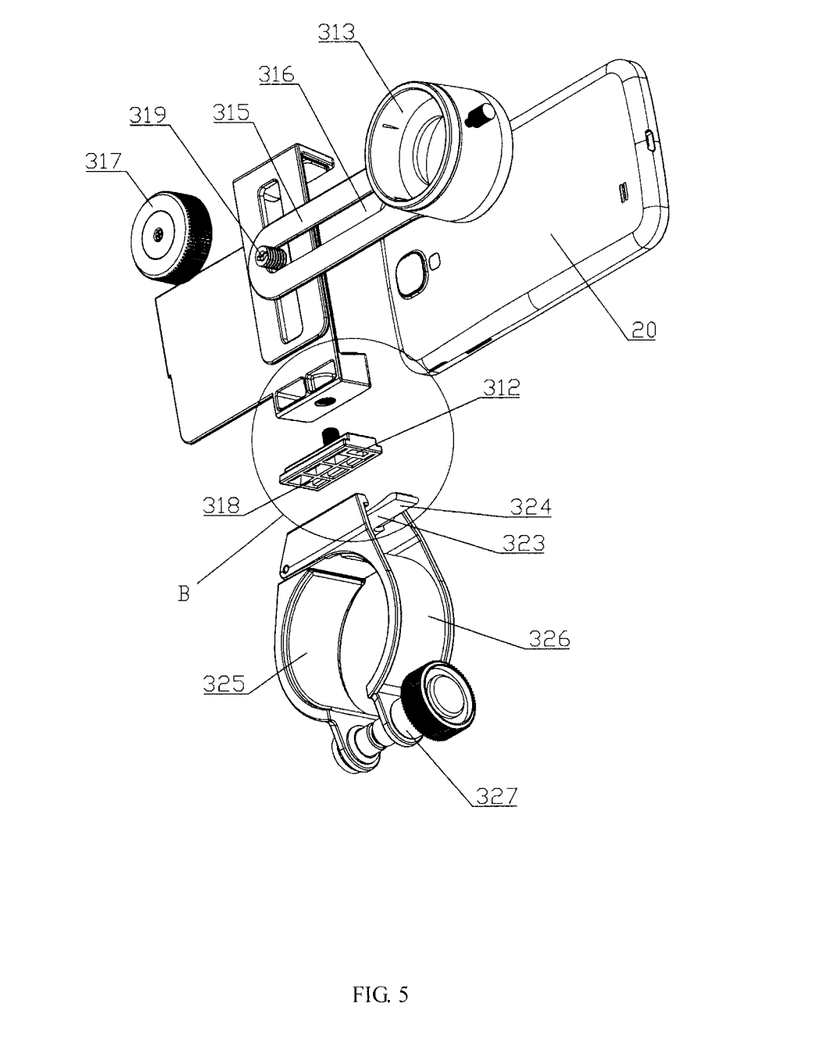
FIG. 5 is an exploded schematic view of a navigation device of the astronomical telescope of the utility model.
Figure 6:
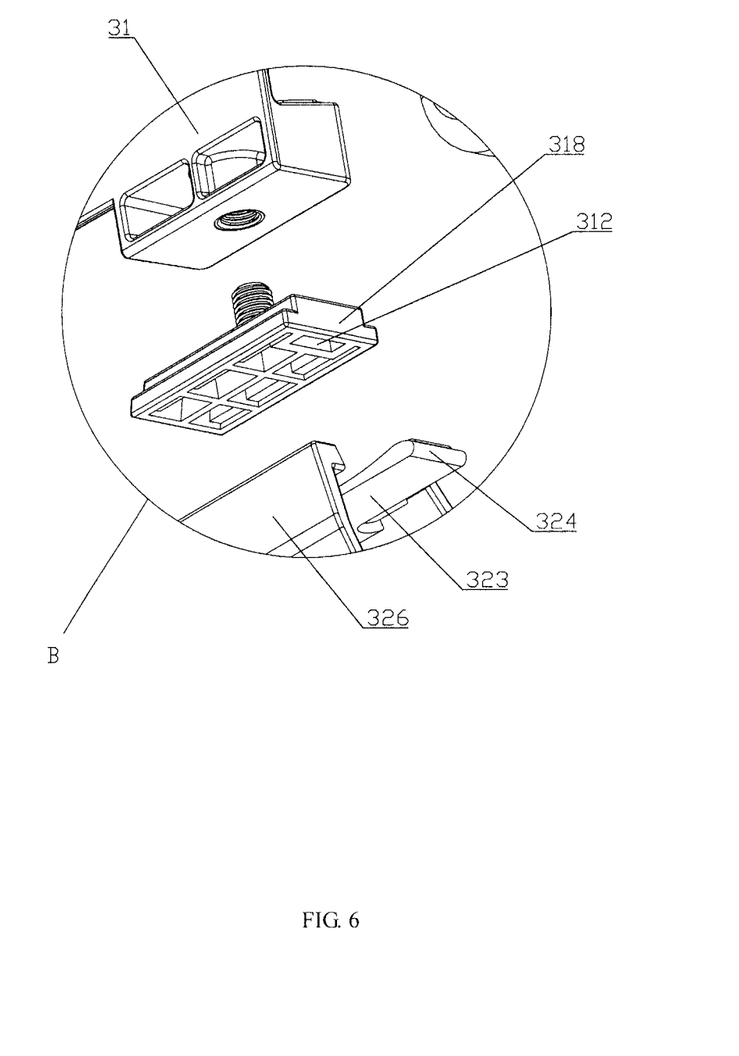
FIG. 6 is a partially enlarged view of B of FIG. 5.

Referring to FIGS. 1 to 6, an astronomical telescope comprises a telescope body on which a navigation support 30 for mounting a navigation device 20 is arranged. In the utility model, as the navigation support 30 for mounting the navigation device 20 is arranged on the telescope body, when in use, the navigation device 20 such as a mobile phone and the like may be mounted on the navigation support 30 and is made coincident in orientation with the telescope body, thus the celestial bodies that the users want to observe may be conveniently positioned using the navigation device 20, thereby facilitating the use. The telescope body generally comprises a tripod 13 and a lens cone 12 on which the navigation support 30 is mounted in this embodiment, so as to be aligned therewith. Of course, in practice, the navigation support 30 may also be mounted on the tripod 13.

The navigation support 30 comprises a clamping bracket 31 for clamping the navigation device 20 and a fixed bracket 32 fixed on the telescope body. The clamping bracket 31 is removably secured on the fixed bracket 32, and thus may be removed to reduce the volume when it needs to be carried or stored during outgoing.

The clamping bracket 31 comprises a base 318, and a substrate for clamping the navigation device 20, wherein the base 318 is removably secured on the fixed bracket 32, and the substrate is removably secured on the base 318. In this embodiment, the base 318 adopts a connection structure, similar to a cradle head of common photographic equipment or a mobile phone holder, which is connected with the substrate by a bolt, thus substrates of different kinds may be replaced flexibly, resulting in a great improvement in universality of the utility model.

The clamping bracket 31 is slidingly arranged on the fixed bracket 32, and a fixing device for constraining transverse sliding of the clamping bracket 31 relative to the fixed bracket 32 so as to secure the clamping bracket 31 on the fixed bracket is arranged on the clamping bracket 31 and/or the fixed bracket 32. Such a structure is capable of firmly and stably securing the clamping bracket 31 on the fixed bracket 32 and also permits easy removal and installation. In this embodiment, both sides of the clamping bracket 31 are respectively provided with a transverse sliding block 311, transverse sliding grooves 321 matched with the sliding blocks 311 are arranged on the fixed bracket 32, and the sliding blocks 311 are slidingly inserted inside the sliding grooves 321 to slidingly arrange the clamping bracket 31 on the fixed bracket 32, thus the structure is simple and facilitates manufacture and assembly. Of course, in practice, a dovetail sliding track structure and the like may be employed to slidingly arrange the clamping bracket 31 on the fixed bracket 32.

The fixing device comprises a positioning groove 312 and a positioning block 322 matched with the positioning groove 312, one of the positioning groove 312 and the positioning block 322 is arranged on the clamping bracket 31, and the other is arranged on the fixed bracket 32. The positioning block 322 is inserted inside the positioning groove 312 with its insertion direction deviating from a sliding direction of the clamping bracket 31 relative to the fixed bracket 32. The positioning block 322 may be driven by an external force to move out of engagement with the positioning groove 312, and the positioning block 322 can restrict the relative sliding between the clamping bracket 31 and the fixed bracket 32 when inserted inside the positioning groove 312, thereby securing the clamping bracket 31. In this embodiment, a transverse elastic plate 323 is arranged on the fixed bracket 32, the positioning block 322 is arranged on the elastic plate 323 and swings therewith, and the elastic plate 323 is provided with a pressing part 324 for being pressed so as to push the elastic plate 323 to swing up and down. The positioning groove 312 is arranged on the clamping bracket 31, and the positioning block 322 may be tightly compressed into the positioning groove 312 by the elasticity of the elastic plate 323, preventing the clamping bracket 31 from coming loose. The positioning block 322 may be allowed to exit the positioning groove 312 so as to unlock the clamping bracket 31 by simply pressing the pressing part 324 to make the elastic plate 323 bend when the clamping bracket 31 needs to be removed, thus being convenient to use. Besides, the structure is simple, the processing is easy, and failures tend not to occur. Of course, in practice, a spring and the like may also be used to compress the positioning block 322 tightly into the positioning groove 312, but is not so limited.

The fixed bracket 32 comprises a first clamping arm 325 and a second clamping arm 326, wherein tail portions of the first clamping arm 325 and the first clamping arm 326 are pivoted together, and head portions of the first clamping arm 325 and the second clamping arm 326 are removably fixed together by a locking member 327. The first clamping arm 325 and the second clamping arm 326 clamp the lens cone 12 together, thereby securing the fixed bracket 32 on the telescope body. The locking member 327 may be frequently-used locking structures such as a screw, a clamping buckle, etc. In this way, the fixed bracket 32 may also be conveniently removed from or mounted on the lens cone 12, thus being convenient to use, carry and store.

The telescope body is provided with a tubular eyepiece 11, the navigation device 20 is a mobile phone, and the clamping bracket 31 is provided with a connection cylinder 313 which is aligned with a camera of the mobile phone. The connection cylinder 313 may be sleeved on the eyepiece 11, and a locking screw 314 is screwed on a side portion of the connection cylinder 313. A front end of the locking screw 314 may compress a side wall of the eyepiece 11 tightly, thereby securing the connection cylinder 313 on the eyepiece 11, thus the mobile phone may be conveniently secured on the eyepiece 11 for video recording, and is therefore convenient to use. An adjusting plate 315 provided with a strip-shaped adjusting hole 316 in the middle thereof is connected on the connection cylinder 313, and the clamping bracket 31 is provided with a stop bolt 319 inserted inside the adjusting hole 316. A locking handwheel 317 is screwed on the stop bolt 319 and clamps the adjusting plate 315 together with the clamping bracket 31 so as to secure the adjusting plate 315 on the clamping bracket 31. Thus, positions of the connection cylinder 313 may be flexibly adjusted so as to use mobile phones of different dimensions, thereby facilitating the use.

The above are merely preferred embodiments of the present utility model, and all technical schemes should fall within the protection scope of the present utility model as long as they achieve the objects of the present utility model using substantially the same means.

What is claimed is:

1. An astronomical telescope, comprising a telescope body, wherein a navigation support for mounting a navigation device is arranged on the telescope body, wherein the navigation support comprises a clamping bracket for clamping the navigation device and a fixed bracket fixed on the telescope body, and the clamping bracket is removably secured on the fixed bracket, wherein the navigation support is configured to position the navigation device coincident in orientation with the telescope body, wherein the clamping bracket comprises a base and a substrate for clamping the navigation device, the base is removably secured on the fixed bracket, and the substrate is removably secured on the base.

2. An astronomical telescope, comprising a telescope body, wherein a navigation support for mounting a navigation device is arranged on the telescope body, wherein the navigation support comprises a clamping bracket for clamping the navigation device and a fixed bracket fixed on the telescope body, and the clamping bracket is removably secured on the fixed bracket, wherein the navigation support is configured to position the navigation device coincident in orientation with the telescope body, wherein the clamping bracket is slidingly arranged on the fixed bracket, and a fixing device for constraining transverse sliding of the clamping bracket relative to the fixed bracket so as to secure the clamping bracket on the fixed bracket is arranged on the clamping bracket and/or the fixed bracket, wherein both sides of the clamping bracket are respectively provided with a transverse sliding block, transverse sliding grooves matched with the sliding blocks are arranged on the fixed bracket, and the sliding blocks are slidingly inserted inside the sliding grooves to slidingly arrange the clamping bracket on the fixed bracket.

3. The astronomical telescope according to claim 2 wherein the fixing device comprises a positioning groove and a positioning block matched with the positioning groove, one of the positioning groove and the positioning block is arranged on the clamping bracket, and the other is arranged on the fixed bracket; the positioning block is inserted inside the positioning groove with its insertion direction deviating from a sliding direction of the clamping bracket relative to the fixed bracket; and said positioning block is configured to be driven by an external force to move out of engagement with the positioning groove.

4. The astronomical telescope according to claim 3, wherein a transverse elastic plate is arranged on the fixed bracket, the positioning block is arranged on the elastic plate and swings therewith, the elastic plate is provided with a pressing part for being pressed so as to push the elastic plate to swing up and down, and the positioning groove is arranged on the clamping bracket.

5. An astronomical telescope, comprising a telescope body, wherein a navigation support for mounting a navigation device is arranged on the telescope body, wherein the navigation support comprises a clamping bracket for clamping the navigation device and a fixed bracket fixed on the telescope body, and the clamping bracket is removably secured on the fixed bracket, wherein the navigation support is configured to position the navigation device coincident in orientation with the a telescope device, wherein the telescope body is provided with a tubular eyepiece, the navigation device is a mobile phone, and the clamping bracket is provided with a connection cylinder which is aligned with a camera of the mobile phone; the connection cylinder is configured to be sleeved on the eyepiece, and a locking screw is screwed on a side portion of the connection cylinder; and a front end of the locking screw is configured to compress a side wall of the eyepiece tightly, thereby securing the connection cylinder on the eyepiece.

6. The astronomical telescope according to claim 5, wherein an adjusting plate provided with a strip-shaped adjusting hole in the middle thereof is connected to the connection cylinder, and the clamping bracket is provided with a stop bolt inserted inside the adjusting hole; and a locking handwheel is screwed on the stop bolt and clamps the adjusting plate together with the clamping bracket so as to secure the adjusting plate on the clamping bracket.

* * * * *